United States Patent
Cibis et al.

(10) Patent No.: US 7,797,965 B2
(45) Date of Patent: Sep. 21, 2010

(54) METHOD FOR PRODUCING TUBES OF QUARTZ GLASS

(75) Inventors: Norbert Cibis, Kahl (DE); Oliver Ganz, Bruchkoebel (DE)

(73) Assignee: Heraeus Quarzglas GmbH & Co. KG, Hanau (DE)

( * ) Notice: Subject to any disclaimer, the term of this patent is extended or adjusted under 35 U.S.C. 154(b) by 620 days.

(21) Appl. No.: 11/665,373

(22) PCT Filed: Sep. 22, 2005

(86) PCT No.: PCT/EP2005/010236

§ 371 (c)(1),
(2), (4) Date: May 15, 2007

(87) PCT Pub. No.: WO2006/039986

PCT Pub. Date: Apr. 20, 2006

(65) Prior Publication Data

US 2008/0041112 A1   Feb. 21, 2008

(30) Foreign Application Priority Data

Oct. 15, 2004   (DE) ................. 10 2004 050 515

(51) Int. Cl.
*C03B 23/00* (2006.01)
*C03B 23/04* (2006.01)
*C03B 23/047* (2006.01)
*C03B 37/02* (2006.01)
*C03B 37/025* (2006.01)

(52) U.S. Cl. ................. 65/108; 65/393; 65/433; 65/435; 65/439; 65/486; 65/489

(58) Field of Classification Search ............ 65/108, 65/393, 433, 435, 439, 486, 489
See application file for complete search history.

(56) References Cited

U.S. PATENT DOCUMENTS 2,464,765 A  *  3/1949  Palmer ................. 53/440

(Continued)

FOREIGN PATENT DOCUMENTS

DE   195 36 960   3/1996

(Continued)

*Primary Examiner*—Khanh Nguyen
*Assistant Examiner*—Carson Gross
(74) *Attorney, Agent, or Firm*—Tiajoloff and Kelly LLP

(57) ABSTRACT

In a known method for producing tubes of quartz glass, a hollow cylinder (2) of quartz glass is continuously supplied to a heating zone (1) and is softened therein in regions, and a tube strand (21) is drawn off at a drawing speed from the softened region with formation of a drawing bulb (26), and the tubes to be produced are cut to length in the form of tube strand pieces by separating the tube strand (21) at a desired separation point (T, Vu, Vo) and an internal pressure differing from the external pressure applied to the outer cladding is maintained in the inner bore (4) of the hollow cylinder (2) in that the inner bore (4) of the tube strand is provided with a flow obstacle. Starting therefrom to indicate a simple method which permits the manufacture of particularly large volume quartz glass tubes with utmost precision, while observing narrow tolerances, it is suggested according to the invention that the flow obstacle should be configured as a constriction (28, 29) of the inner bore which is produced by softening and plastic deformation of the tube strand in the area of a deformation zone (Vu, Vo).

18 Claims, 1 Drawing Sheet

U.S. PATENT DOCUMENTS

Figure 1:
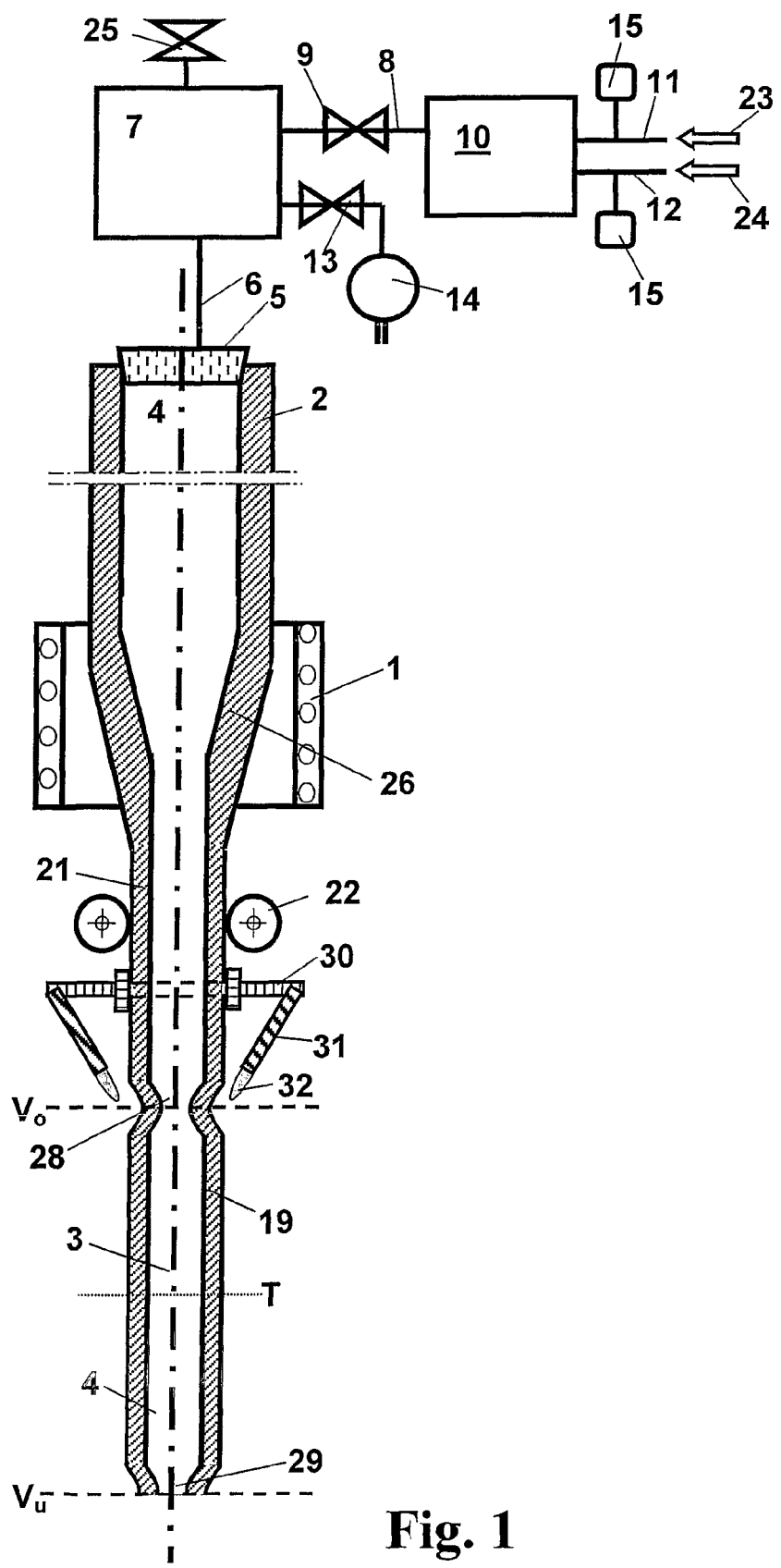

| | | | |
|---|---|---|---|
| 4,780,142 A | 10/1988 | Rechter | |
| 5,026,413 A | 6/1991 | Lebert et al. | |
| 6,098,428 A | 8/2000 | Bogdahn et al. | |
| 6,516,636 B1 * | 2/2003 | Gansicke et al. | 65/379 |

FOREIGN PATENT DOCUMENTS

| | | |
|---|---|---|
| EP | 0 394 640 | 10/1990 |
| EP | 0 364 640 B1 | 8/1993 |
| WO | WO 02/098808 | 12/2002 |

* cited by examiner

METHOD FOR PRODUCING TUBES OF QUARTZ GLASS

The present invention relates to a method for producing tubes of quartz glass, wherein a hollow cylinder of quartz glass is continuously supplied to a heating zone and softened therein in regions and a tube strand is drawn off at a drawing rate from the softened region with formation of a drawing bulb, and the tubes to be produced are cut to length in the form of tube strand pieces by separating the tube strand at a desired separation point, wherein an internal pressure differing from the external pressure applied to the outer cladding is maintained in the inner bore of the hollow cylinder in that the inner bore of the tube strand is provided with a flow obstacle.

Tubes of quartz glass are used in the form of semi-finished or finished products in the chemical industry, in semiconductor manufacture, in the optical field and particularly for making preforms for optical fibers.

DE 195 36 960 A1 describes a method for making quartz glass tubes in a vertical drawing process. A quartz glass cylinder held on a carrier is here supplied, starting with its lower end, to an annular furnace having a graphite heating element and is softened therein zonewise with formation of a drawing bulb. A quartz glass tube is vertically drawn off downwards from the drawing bulb by means of a take-off device. Compressed air which serves to produce a required blowing pressure inside the inner bore is introduced into the inner bore of the quartz glass cylinder. The blowing pressure is sensed by means of a pressure measuring device and used for controlling the wall thickness of the drawn-off quartz glass tube.

To enhance productivity, the attempt is made to use increasingly larger-volume hollow cylinders with larger wall thicknesses and inner diameters as the starting material for the vertical drawing process. With an increasing inner diameter greater gas flows are needed for setting the necessary blowing pressure and for ensuring an operative pressure control. These increased gas flows as such are however a considerable cost factor on the one hand, particularly when inert gases are used, and they lead to a cooling in the area of the drawing bulb on the other hand, thereby impairing the drawing process noticeably.

It is suggested in EP 0 394 640 B1, which discloses a method of the above-mentioned type, that the lower open end of the tube strand should be closed with a gaseous, liquid or solid plug. The plug serves as a flow obstacle in the inner bore of the tube strand, thereby reducing the gas flow. As a result, a predetermined blowing pressure can be observed even in the case of a relatively small gas flow in the inner bore of the tube strand.

When the tube pieces are cut to length, a plug used at the end of the tube strand would lose its effect, and a new plug would have to be introduced. Even if the plugs were changed very rapidly, this would lead to pressure variations and to unacceptable changes in geometry. That is why it is suggested in EP 0 394 640 B1 that cutting to length should be carried out under water or in a pressure chamber in which a pressure prevails that is similar to the blowing pressure.

Both variants of the method are however very complicated in terms of construction. Moreover, the residence time in such a pressure chamber has to be restricted for reasons of health, and access is rendered difficult by the necessary sluice.

It is suggested in EP 0 394 640 B1 as a further embodiment for an outflow obstacle that a sealing plug secured to a telescopically extensible holding tube should be introduced from below into the inner bore of the drawn-off tube strand, the desired separation point for cutting the tube strand to length being positioned below the level of the sealing plug.

This method is also complicated; the introduction of the sealing plug and the removal of the holding tube from the separated tube piece turn out to be complicated and may damage the inner wall of the tube to be produced.

It is therefore the object of the present invention to provide a simple method which permits the manufacture of particularly large-volume quartz glass tubes with utmost precision, while observing narrow tolerances, by way of a drawing process. Starting from a drawing process of the above-mentioned type, this object is achieved according to the invention in that the flow obstacle is configured as a constriction of the inner bore which is produced by softening and plastic deformation of the tube strand in the area of a deformation zone.

In the method of the invention, a constriction of the inner bore of the tube strand helps to maintain the internal pressure. The constriction reduces the open flow cross-section of the inner bore either in part or completely, i.e., it can also lead to a complete closure of the inner bore.

The constriction is formed by softening and plastic deformation of the tube strand during the drawing process. It is thereby possible without any high constructional efforts to minimize the gas flow through the inner bore of the tube strand as is required for producing, maintaining and controlling the blowing pressure.

At least one constriction of such a type is always operative in the drawing process. The cutting to length of the tube strand to obtain the desired tube lengths is carried out directly during drawing or in a separate method step after the drawing process.

The constriction of the inner bore of the tube strand is formed either in the drawing bulb, the heating means for heating and softening the hollow cylinder simultaneously serving as a heating source for producing the deformation, or when viewed in the drawing direction the constriction is formed after the drawing bulb by using a heating source separated from the heating means.

Preferably, the constriction of the inner bore is produced between the drawing bulb and the desired separation point.

The outflow obstacle is here configured as a constriction of the inner bore that is provided above the desired separation point. To obtain a situation where the action of the constriction as an outflow obstacle is not impaired or is only impaired insignificantly during the cutting to length of the tube strand pieces, the position of the desired separation point should be chosen such that at least one constriction of such a type is additionally provided between the drawing bulb and the separation point.

Many measures are suited for producing the constriction. In a simple variant of the method, the constriction of the inner bore is produced in that the tube strand is softened in the area of the deformation zone and is deformed by means of a tool.

This guarantees a reproducible degree of deformation in a particularly simple manner without the need for changing the process parameters of the drawing process. Moreover, the area of the deformation zone can be kept very small, which reduces the loss in material. This variant of the method is particularly preferred in the case of a high internal pressure. In the area of the deformation produced by means of the tool, mechanical stresses are formed easily, such stresses facilitating the separation of the tube strand in this area. The produced deformation consists e.g. in a squeeze.

As an alternative or as a supplement, it has also turned out to be useful when the constriction of the inner bore is produced in that the tube strand is softened in the area of the deformation zone and is deformed under the action of a relative movement between tube strand sections at both sides of the deformation zone.

In this variant of the method according to the invention, the force for forming the constriction is produced in that, when viewed in the drawing direction, the tube strand section extending downstream of the softened region is moved relative to the deformation zone, said movement producing the deformation of the tube strand which leads to a constriction of the inner bore. An advantage of this measure is that the deformation occurs at the hottest point where it is normally very difficult for a tool to gain access, e.g. because it is surrounded by a heating element.

The corresponding movement of the tube strand section extending downstream of the softened region may e.g. consist in twisting, upsetting, short-time rapid elongation and/or in a bending operation.

Hence, the relative movement in the simplest case comprises a rotation of the downstream tube strand section about the longitudinal axis of the tube strand, a short-time drawing off of the downstream tube strand section in the direction of the longitudinal axis of the tube strand at a speed smaller or greater than the drawing speed, and/or a bending (folding) of the downstream tube strand section relative to the longitudinal axis of the tube strand.

An adequate softening of the quartz-glass tube strand requires some time, which depends on the energy input by a heating source and a possible residual heat of the tube strand. In this respect it has turned out to be advantageous when the tube strand is softened in that the thermal action of a heating source on the area of the deformation zone is maintained while it is being transported along a predetermined movement path in drawing direction.

The heating action of the heating source is here focused for a specific period of time on a predetermined area, namely the deformation zone of the tube strand moving at the drawing speed. The heating source, or its heating action, is made to follow the deformation zone, the follow-up movement possibly consisting in the measure that the heating source is moved at the speed of the deformation zone, or that a heating flame or a heating beam (laser) of the moving deformation zone is made to follow, or that individual heating elements of the heating source are successively activated, each at the current level (position) of the deformation zone.

This follow-up movement of the heating source or the heating action also accomplishes a small deformation zone in the case of thick-walled quartz glass tubes.

It has turned out to be particularly useful when the heating source is made to follow the deformation zone in the drawing direction and at the drawing speed.

A variant of the method turns out to be particularly simple wherein the follow-up movement is carried out by fixing the heating source to the tube strand.

The heating source which is fixed to the tube strand moves automatically at the drawing speed and in synchronism with the deformation zone without the need for a separate transportation means. The heating source is e.g. fixed by being clamped onto the tube strand. To avoid any action of the heating source on the drawing process and to avoid any additional load on the take-off device, the weight of the heating source which acts on the drawing bulb is advantageously balanced.

Advantageously, the formation of the constriction of the inner bore is accompanied by a cutting to length of the tube strand in such a manner that the desired separation point comes to rest in the area of the deformation zone.

Since the constriction is produced by plastic deformation of the tube strand and since the plastically deformed area normally means a waste of material, the desired separation point is preferably located in said area. The formation of the constriction of the inner bore required for pressure control and the separation of a tube piece from the tube strand are here preferably carried out in one operation. Thus the cutting to length of the tube strand is accomplished by melting off tube pieces.

The desired separation point comes to rest in the area of the deformation zone in this process, so that the deformation is created at the end of the separated tube where it can be removed easily. On the other hand, the free end of the tube strand remaining in the drawing process still comprises a constricted inner bore due to the separation in the deformation zone, which again serves as an outflow obstacle within the meaning of the present invention.

This measure does not exclude an additional cutting to length of the tube strand by way of purely mechanical measures, such as breaking or sawing, on condition that upstream of the corresponding separation point there is still provided a constriction of the inner bore that is suited as an outflow obstacle. On the contrary, since each deformation zone means a loss in material, the number thereof is kept as small as possible, so that, when viewed in the drawing direction, preferably at least one, particularly preferably several desired separation points are provided after a constriction of the inner bore, the cutting to length of the tube strand being carried out by way of mechanical measures at said separation points.

The invention shall now be explained in detail with reference to embodiments and a drawing, which as the sole FIGURE is a schematic illustration showing in FIG. 1 a schematic diagram of an apparatus for carrying out the method of the invention.

The drawing device according to FIG. 1 comprises a vertically arranged furnace which can be heated to temperatures above 2300° C. and comprises an annular resistance heating element 1, a gas supply system and a take-off device 22.

In the drawing process, a hollow cylinder 2 of synthetic quartz glass (hatched illustration) with a vertically oriented longitudinal axis 3 is continuously supplied from above to the heating element 1 and is heated therein zonewise, and a tube strand 21 is drawn off from the softened area with formation of a drawing bulb 26.

Hollow cylinder 2 and tube strand 21 have a joint inner bore 4. Said bore is open downwards and closed upwards with a plug 5. A scavenging gas line 6 projects through the plug 5 into the inner bore 4 which is supplied by a process container 7 with a mixed gas consisting of oxygen and nitrogen. The process container 7 is connected to a mixing container 10 via a mixed gas line 8 which can be closed by means of a shut-off valve 15. A nitrogen line 11 and an oxygen line 12 terminate in the mixing container 10. Nitrogen line 11 and oxygen line 12 are each provided with a flow meter and control device 15. The directional arrow 23 marks a nitrogen flow and the directional arrow 24 an oxygen flow.

The process container 7 which is connected via a control valve 13 to a vacuum pump 14 serves to buffer possible pressure variations in the mixed gas line. For the purpose of compensating pressure variations the process container 7 is additionally provided with a bypass valve 25 which can be opened and closed. In the opened state, part of the gas is continuously flowing out of the process container 7 so that sudden changes in the flow conditions caused by control intervention or due to other reasons have only a partial effect on pressure changes in the process container 7.

In the drawing process a mixed gas flow (23; 24) consisting of pure nitrogen and of oxygen of purity class 2.6 (99.96%) is introduced via the scavenging gas line 6 from above into the inner bore 4. The mixed gas flow (23; 25) is produced in the mixing container 10 in that the container is fed with nitrogen of purity class 4.0 (99.99%) via the nitrogen line 11 and with oxygen via the oxygen line 12. The feed rates of nitrogen and oxygen are set such that a mixed gas flow (23; 24) consisting of 80% nitrogen and 20% oxygen is formed throughout the drawing phase.

A procedure that is typical of the method of the invention shall now be described in more detail with reference to FIG. 1:

The hollow cylinder 2 has an outer diameter of 150 mm and a wall thickness of 50 mm. After the heating element 1 has been heated to its desired temperature of about 2300° C., the hollow cylinder 2 is lowered with the lower end 19 at a lowering rate of 18 mm/min, and the end 19 which is softened in the heating element 1 is drawn off by means of the take-off device 22 at a rate of 1800 mm/min to obtain a tube strand 21 having an inner diameter of 6 mm and an outer diameter of 8 mm.

A mixed gas having the above composition of 80% nitrogen and 20% oxygen is supplied to the inner bore 4 via the scavenging gas line 6. The flow rate of the nitrogen flow 23 is adjusted by the flow meter and control device 15 to about 100 $m^3/l$ and that of the oxygen flow 24 to about 24 $m^3/h$. A substantially constant overpressure (blowing pressure) of 1.5 mbar is obtained in the inner bore 4. The blowing pressure is continuously measured and the flow rate of the nitrogen flow 23 is adjusted accordingly (manipulated variable of the pressure control). The mixed gas flow (23; 24) simultaneously serves to control the dimensions (outer diameter, inner diameter, wall thickness) of the drawn-off tube strand 21 as a manipulated variable, so that in the case of dimensional changes the amount of the mixed gas flow (23; 24) is adjusted by a control unit at an approximately constant mixing ratio.

In the drawing process the bypass valve 25 is opened, so that part of the mixed gas flow (23; 24) flows via the valve to the outside and not into the inner bore 4 of the glass tube 21. Pressure variations in the inner bore 4 are buffered in this way. This is also supported by the measure of the present invention that will now be described in more detail.

To reduce the flow rate of the mixed gas flow (23; 24) through the inner bore 4 and thus to prevent excessive cooling of the drawing bulb 26, the inner bore 4 of the drawn-off tube strand 21 is provided with constrictions 28, 29. The constrictions 28, 29 are produced below the plane of the take-off device by plastic deformation of the tube strand 21.

In the embodiment, a constriction 29 of the inner bore 4 is present in the deformation plane $V_u$ at the end of the tube strand 21. For producing a further constriction 28 above the deformation plane $V_u$, a water-cooled heating carrier ring 30 which is equipped with eight oxyhydrogen burners 31 that are distributed over the circumference thereof is clamped to the tube strand 21, the flames 32 of the oxyhydrogen burners 31 being directed to a joint circumferential line around the outer cladding of the tube strand 21, the line being positioned below the clamping point of the heating carrier ring 30 and designated in FIG. 1 as "$V_o$". The maximum of plastic deformation, which is illustrated by a broken line "$V_o$", is situated in the area of the circumferential line. The deformation produces a constriction of the inner bore 4 with a length of several centimeters. The deformation is produced in that the area around the circumferential line "$V_o$" is heated by means of the oxyhydrogen burners 31 for such a long time that it can be deformed plastically. The period required therefor depends on the energy input by the oxyhydrogen burners 31 and on the wall thickness of the tube strand 21 and is about 30 seconds in the embodiment. During this period the heating carrier ring 30 is carried along together with the downwardly moving tube strand 21. As soon as an adequate plastic deformability has been achieved, the lower end 19 of the tube strand 21 is twisted by half a rotation around the longitudinal axis 3, resulting in the formation of the constriction 28 of the inner bore 4.

The weight of the heating carrier ring 30 and of the oxyhydrogen burners 31 mounted thereon is balanced by means of an auxiliary device (not shown).

The tube strand 21 is cut to length such that a constriction 28, 29 is always operative in a flow reducing manner. To this end there are several preferred modes of operation, which will be described hereinafter in more detail.

The tube strand 21 is cut to length in one operation with the formation of the constriction 28 in that the lower end 19 is simultaneously drawn off downwards together with the softening and twisting and is thereby molten off from the tube strand 21. This melting process produces a similar constriction of the inner bore 4, as schematically shown by way of reference numeral 29 in FIG. 1, at the lower end of the tube strand 21 which is now free. The process of forming the constriction and of melting is repeated for each tube piece to be separated. It is thereby ensured that the inner bore 4 will even comprise a constriction 28, 29 if a tube piece has just been cut off. Pressure variations are thereby avoided.

As an alternative, the constriction 28 of the inner bore 4 is produced by plastic deformation, as has been described above, but without the corresponding tube piece 19 being molten off. In this case several tube pieces are separated at desired separation points "T" from the lower tube piece 29 in the area below the constriction 28 and between the deformation planes "$V_o$" and "$V_u$". To this end a predetermined breaking point is first produced in the area of the desired separation point "T" by way of scratching and the tube piece is then knocked off by means of a hammer at the predetermined breaking point. The previously produced constriction 28 prevents the scavenging gas from flowing out of the inner bore 4 and avoids pressure differences during separation of the tube pieces at the desired separation points "T". In the further drawing process, a desired separation point "T" will sooner or later be found in the area of the deformation plane $V_o$, so that the process stage shown in FIG. 1 is then reached which requires the renewed production of a constriction in the upper area of the tube strand 21.

The tube strand 21 in the area of the separation points "T" between the deformation planes "$V_o$" and "$V_u$" can also be separated in a separate method step after the tube strand 21 has been separated in the area of the deformation planes "$V_o$".

The tube pieces which have been cut to length are used as an intermediate product for making preforms for optical fibers. These are e.g. so-called substrate tubes for the inside deposition of $SiO_2$ layers in an MCVD or PCVD process. Substrate tubes are typically provided with an outer diameter of about 50 mm and with wall thicknesses ranging from 2 mm to 4 mm. The method according to the invention is however particularly suited for the production of quartz glass tubes having an increased inner diameter, as are e.g. used as cladding or intermediate tubes for preform or fiber production. Typical outer diameters have here a size of 80 mm at a wall thickness of 10 mm.

The invention claimed is:

1. A method for producing tubes of quartz glass, said method comprising:
   continuously supplying a hollow cylinder of quartz glass to a heating zone and softening a region of the cylinder therein, and
   drawing off a tube strand at a drawing speed from a softened region so as to form a drawing bulb, and
   cutting the tubes to length in the form of tube strand pieces wherein the tube strand pieces are separated from the tube strand at a separation point,
   wherein the hollow cylinder has an inner bore, and
   wherein the method further comprises maintaining an internal pressure differing from an external pressure applied to an outer surface of the cylinder in the inner bore of the hollow cylinder, and
   wherein the tube strand has an inner bore, and
   wherein the method further comprises producing a constriction of the inner bore between the drawing bulb and the separation point, wherein the constriction of the inner bore of the tube strand is produced by softening and plastic deformation of the tube strand in an area of a deformation zone,
   wherein the constriction acts as a flow obstacle that obstructs gas flow through the inner bore of the tube strand.

2. The method according to claim 1, wherein the constriction of the inner bore is produced in-that the tube strand is softened in the area of the deformation zone and is deformed using a tool.

3. The method according to claim 1, wherein the constriction of the inner bore is produced in that the tube strand is softened in the area of the deformation zone and is deformed by a relative movement between tube strand sections at both sides of the deformation zone.

4. The method according to claim 3, wherein the relative movement comprises rotation of downstream tube strand sections about a longitudinal axis of the tube strand.

5. The method according to claim 3, wherein the relative movement comprises drawing off of a downstream tube strand section at a speed which is smaller or greater than the drawing speed, in a direction of a longitudinal axis of the tube strand.

6. The method according to claim 3, wherein the relative movement comprises bending of a downstream tube strand section relative to a longitudinal axis of the tube strand.

7. The method according to claim 1, wherein thermal action of a heating source on the area of the deformation zone is maintained while the tube strand is transported along a predetermined movement path in a drawing direction.

8. The method according to claim 7, wherein the heating source follows in the drawing direction and at the drawing speed.

9. The method according to claim 8, wherein the heating source follows by fixing the heating source to the tube strand.

10. The method according to claim 9, wherein the heating source is fixed above the deformation zone to the tube strand.

11. The method according to claim 1, wherein formation of the constriction of the inner bore is accompanied by the cutting to length the tube strand so that the separation point rests in the area of the deformation zone.

12. The method according to claim 1, wherein, when viewed from the drawing direction, a separation point is provided after a constriction of the inner bore, the cutting to length of the tube strand being carried out at said separation point by mechanical measures.

13. The method according to claim 1, wherein, when viewed from the drawing direction, a plurality of separation points are provided after a constriction of the inner bore, the cutting of the tube strand being carried out at said separation points by mechanical measures.

14. The method according to claim 4, wherein the relative movement comprises drawing off of a downstream tube strand section at a speed which is smaller or greater than the drawing speed, in a direction of a longitudinal axis of the tube strand.

15. The method according to claim 14, wherein the relative movement comprises bending of a downstream tube strand section relative to a longitudinal axis of the tube strand.

16. The method according to claim 4, wherein the relative movement comprises bending of a downstream tube strand section relative to a longitudinal axis of the tube strand.

17. The method according to claim 5, wherein the relative movement comprises bending of a downstream tube strand section relative to a longitudinal axis of the tube strand.

18. The method according to claim 1, wherein the constriction acts as a flow obstacle that partially obstructs gas flow through the inner bore of the tube strand.

* * * * *